A. W. LISSAUER, W. L. FLEISHER AND R. E. KEYES.
METHOD OF DESICCATION.
APPLICATION FILED MAR. 27, 1919.
1,339,115.
Patented May 4, 1920.
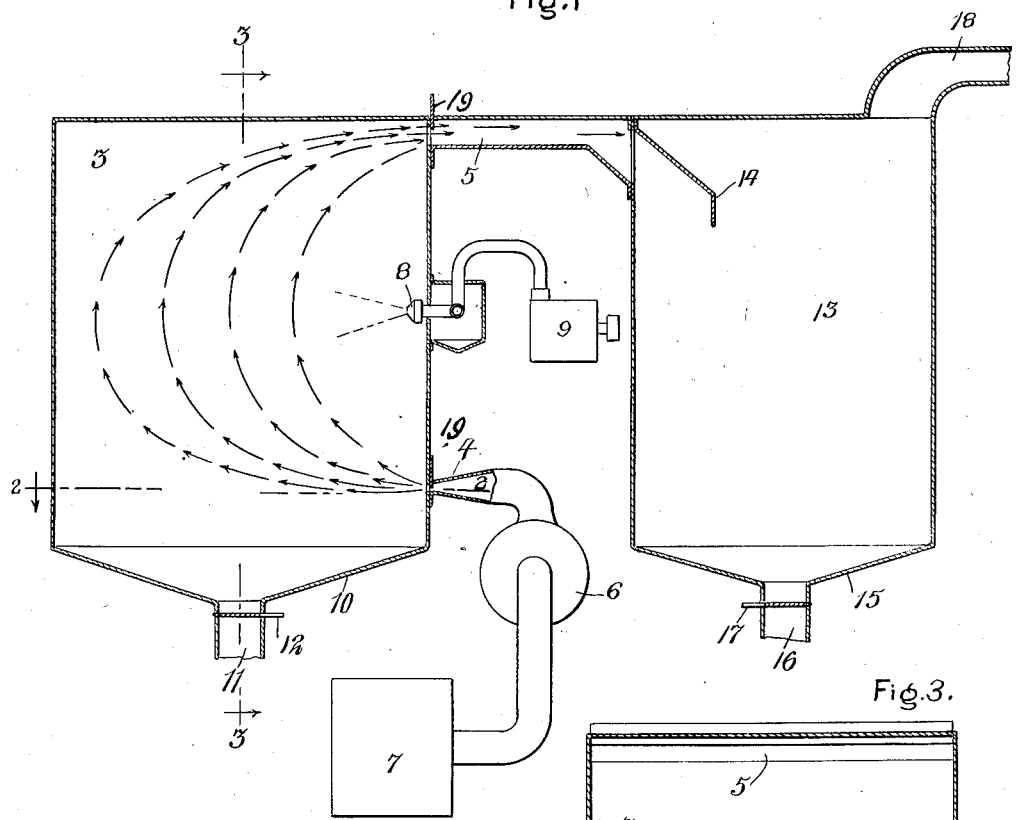
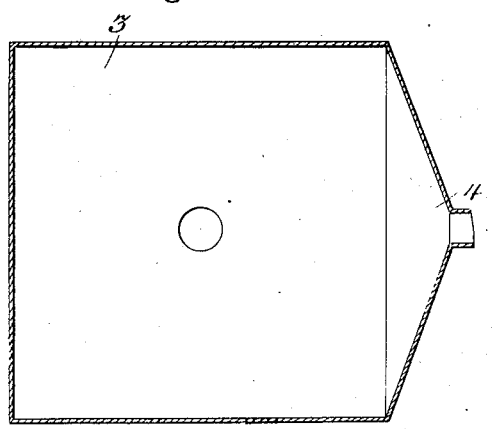
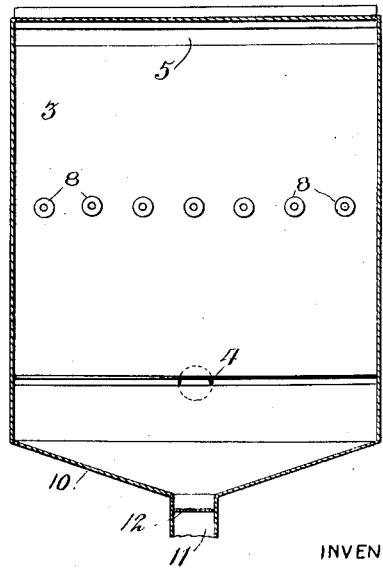
INVENTORS
A.W. LISSAUER
W.L. FLEISHER
R.E. KEYES

UNITED STATES PATENT OFFICE.

ADOLPH W. LISSAUER, WALTER L. FLEISHER, AND ROBERT E. KEYES, OF NEW YORK, N. Y., ASSIGNORS TO AMERICAN DRYING PROCESSES, INC., OF NEW YORK, N. Y., A CORPORATION OF NEW YORK.

METHOD FOR DESICCATION.

1,339,115.  Specification of Letters Patent.  Patented May 4, 1920.

Application filed March 27, 1919. Serial No. 285,527.

*To all whom it may concern:*

Be it known that we, ADOLPH W. LISSAUER, WALTER L. FLEISHER, and ROBERT E. KEYES, all citizens of the United States, the first two residents of the city, county, and State of New York, the last a resident of the county of Bronx, city and State of New York, have invented a new and Improved Method for Desiccation, of which the following is a full, clear, and exact description.

The object of our invention is to provide a simple, inexpensive and efficient method for desiccating substances which can be atomized, such for example as milk. In our method the drying or desiccating agent is an air current which is formed into a sheet or layer circulated so that it bends or folds into a flat curve or arc having substantially the shape of coaxial parabolas. Through this arcuated air sheet or layer the substance to be desiccated is atomized to cause said atomized substance to penetrate the maximum section of said arcuated or folded air sheet.

In the accompanying drawing forming part of the application, Figure 1 represents a diagrammatic, sectional view through a form of an apparatus suitable for our method and in which the air sheet is considerably exaggerated for the proportion of the chamber illustrated. Fig. 2 shows a diagrammatic horizontal section through Fig. 1 on line 2—2, and Fig. 3 is a vertical section on line 3—3 Fig. 1.

Before proceeding to a more detailed description of our invention it must be understood that the term "folding" or "bending" or "arcuated" as used in the body of the specification or claims is distinguished from the term "enveloping" for in our method the air current is so generated that the same is caused to arch or fold into a flat curve about the spray of the substance as distinguished from an air current enveloping the spray or circulating about the spray in a spiral. It may be remarked that in our method of desiccation there is no stratification of air currents with the atomized substance for the atomized substance is caused to intersect the air current which arches or folds about the atomized substance.

Referring to the drawings, 3 is the desiccating chamber which has an elongated air inlet 4 located preferably in proximity to the bottom of the chamber. The chamber has an elongated air outlet 5 located on the same side preferably above the inlet near the top of the chamber. The reason for locating the air outlet above the inlet is because the air used for desiccation is preheated and therefore has a natural tendency to rise. If desired, the air inlet can be placed near the top of the chamber and the air outlet near the bottom, with probably little loss of efficiency in the apparatus. The air is supplied by a fan 6 which is adapted to draw the air through a heater 7 before it forces same into the chamber 3. The air entering the chamber through the inlet 4 will have a tendency to expand as it enters the chamber consequently decreasing in speed. Before it can leave the chamber 3 through the outlet 5 its speed will increase due to the decrease in the cross-section of the layer or sheet of the air. In other words, the velocity of the air at the inlet 4 and outlet 5 is considerably greater than at any point between the inlet and the outlet. The minimum velocity will be between the inlet and the outlet and at that part of the layer the cross-section of the sheet will be at maximum. If desired, the velocity at the inlet and the outlet could be adjusted by means of slides 19 by means of which the size of the openings could be adjusted.

A series of nozzles 8 are located within the chamber 3 between the inlet 4 and the outlet 5 on the same side of the chamber. Preferably the nozzles are disposed in a plane running parallel with the inlet and outlet and located so as to atomize the substance through the maximum cross-section of the arching or folding air sheet as indicated by the arrows in Fig. 1. The series of the nozzles are adapted in combination to produce a flat spreading sheet of the atomized substance. A suitable device 9, such as a pump or blower, is provided for atomizing the substance through the nozzles 8.

As will be seen from the drawings the atomized substance attacks the arching or folding air current substantially in a plane transverse to the direction of the current. The intersecting currents of heated air and atomized substance causes the formation of eddies which increase the intimate contact of the substance and air and thereby increase the efficiency of desiccation. It is evident that the chamber 3 may be of any suitable configuration, but, considering the cheapness of construction, a polygonal chamber is more economical.

The substance desiccated in the chamber 3 falls to the bottom which is preferable in the shape of a hopper provided with an outlet 11 having a gate 12. It is of importance that the velocities of the atomized substance should not be strong enough to travel across the heated air current for if it does strike the wall of the chamber a certain amount of the undried atomized material will fall to the bottom of the chamber 3 and in consequence damage the properly dried substance. In other words, the efficiency of the drying depends on the velocities of the two currents, that is the air current and the current of the atomized substance, and the air current velocities must be greater than those of the current of the atomized substance so that the same could not pass across the air current. It is self-evident that the velocities of the two currents may be varied but the variation must be such that the current of the atomized substance is not strong enough to pass across the layer of the air current.

The outlet 5 of the desiccating chamber may be connected to a similar chamber wherein the air sheet may be caused to arch or bend once more and into the bent or arched air current a further injection of the atomized substance may be produced. In other words, in lieu of a single stage drying a double or triple stage may be established. As shown the outlet 5 is connected directly to a settling chamber 13 having a baffle 14, to direct the entering current toward the hopper shaped bottom 15 of said settling chamber. The purpose of the chamber is to direct the drying material carried away by the air to be settled within the settling chamber 13. The bottom of the chamber has an outlet 16 provided with a gate 17. The chamber 13 has also an air outlet 18 which is preferably located at the top to cause the entering current to travel through a long path and force a separation of the drying material from the current.

If desired, the fan 6 can be connected to the outlet 18 so that the air will be drawn in place of being forced through the chamber 3 with substantially the identical results. It may be remarked in lieu of providing the inlet and the outlet on the side of the chamber. The inlet and the outlet, and the supply of substance to be dessicated can be provided at the bottom or top of the chamber, provided the relation between the inlet and the outlet on the nozzles is maintained as previously described.

We claim:

1. Method of desiccation which consists in creating an air current in the form of a folding sheet and atomizing the substance to be desiccated into said air current so that the sheet folds about the current of the atomized substance to be desiccated.

2. Method of desiccation which consists in creating an air current in the form of a curved sheet having substantially the shape of a parabola and forcing the atomized substance to be desiccated into the concave side of the curved air sheet.

3. Method of desiccation which consists in forming an air sheet so that the same flows in a curved path having substantially the shape of a parabola and intersecting the said curved path of air by the current of an atomized substance directed substantially parallel with the axial plane of the curved path.

4. Method of desiccation which consists in forming an air sheet so that the same flows in a curved path having substantially the shape of a parabola and forcing the current of an atomized liquid into the concave part of said air sheet.

5. Method of desiccation which consists in creating an air current in the form of a curved sheet and forcing an atomized substance to be desiccated into the maximum curvature of the curved air sheet from the concave side of the curved sheet.

6. Method of desiccation which consists in creating an air current having the form of a folding sheet of varying cross-section and forcing a current of an atomized substance into the maximum cross-section of said folding sheet from the concave side of the curved sheet.

7. Method of desiccation which consists in creating a substantially flat current of an atomized substance to be desiccated and intersecting said current of atomized substance by an air sheet folding about said current of the atomized substance.

8. Method of desiccation which consists in creating a current of an atomized substance in the form of a substantially flat spreading sheet and intersecting the current of the atomized substance by a rising air current in the form of a sheet folding about and intersecting the atomized substance.

9. The method of desiccation which consists in forming an air sheet so that the same flows in a curved path of single curvature and intersecting the concave side of the said curved path of air by a current of an atomized substance, the relative velocities of the two currents being such that the current of the substance to be desiccated cannot cross the air current.

ADOLPH W. LISSAUER.
WALTER L. FLEISHER.
ROBERT E. KEYES.